United States Patent
Müller et al.

(10) Patent No.: US 9,249,259 B2
(45) Date of Patent: *Feb. 2, 2016

(54) METHOD FOR ACTIVATING DOUBLE METAL CYANIDE CATALYSTS FOR PRODUCING POLYETHER POLYOLS

(75) Inventors: Thomas Ernst Müller, Aachen (DE); Christoph Gürtler, Köln (DE); Matthias Wohak, Dormagen (DE); Jörg Hofmann, Krefeld (DE); Muhammad Afzal Subhani, Aachen (DE); Maurice Cosemans, Heinsberg (DE); Walter Leitner, Aachen (DE)

(73) Assignee: Bayer Intellectual Property GmbH, Monheim (DE)

(*) Notice: Subject to any disclaimer, the term of this patent is extended or adjusted under 35 U.S.C. 154(b) by 37 days.

This patent is subject to a terminal disclaimer.

(21) Appl. No.: 14/232,015

(22) PCT Filed: Jul. 17, 2012

(86) PCT No.: PCT/EP2012/063979
§ 371 (c)(1),
(2), (4) Date: Feb. 17, 2014

(87) PCT Pub. No.: WO2013/011014
PCT Pub. Date: Jan. 24, 2013

(65) Prior Publication Data
US 2014/0228537 A1    Aug. 14, 2014

(30) Foreign Application Priority Data
Jul. 18, 2011    (EP) .................................... 11174410

(51) Int. Cl.
| | |
|---|---|
| *C08G 64/32* | (2006.01) |
| *C08G 64/34* | (2006.01) |
| *C08G 65/26* | (2006.01) |
| *C08G 64/00* | (2006.01) |
| *C07C 68/04* | (2006.01) |

(52) U.S. Cl.
CPC .............. *C08G 64/323* (2013.01); *C08G 64/34* (2013.01); *C08G 65/2603* (2013.01); *C08G 65/2663* (2013.01)

(58) Field of Classification Search
CPC ...................................................... C08G 64/32
USPC ........................................... 528/405; 558/266
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. |
| 5,470,813 A | 11/1995 | Le-Khac |
| 5,844,070 A | 12/1998 | Hayes et al. |
| 6,780,813 B1 | 8/2004 | Hofmann et al. |
| 7,008,900 B1 | 3/2006 | Hofmann et al. |
| 2003/0204042 A1 | 10/2003 | Moethrath et al. |
| 2012/0289732 A1 | 11/2012 | Gurtler et al. |

FOREIGN PATENT DOCUMENTS

| | | |
|---|---|---|
| DE | 101 47 712 A1 | 4/2003 |
| EP | 0 222 453 A2 | 5/1987 |
| EP | 0700949 A2 | 3/1996 |
| EP | 0743093 A1 | 11/1996 |
| EP | 0761708 A2 | 3/1997 |
| EP | 1359177 A1 | 11/2003 |
| JP | 4145123 B2 | 9/2008 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-03/029325 A1 | 4/2003 |
| WO | WO-2011089120 A1 | 7/2011 |

OTHER PUBLICATIONS

U.S. Appl. No. 14/131,977 claims (Feb. 2014).*
International Search Report for PCT/EP2012/063979 mailed Oct. 9, 2012.

* cited by examiner

*Primary Examiner* — Duc Truong
(74) *Attorney, Agent, or Firm* — Drinker Biddle & Reath LLP

(57) ABSTRACT

The present invention relates to a process for the activation of double metal cyanide (DMC) catalysts and to a process for the preparation of polyethercarbonate polyols from one or more H-functional starter compounds, one or more alkylene oxides and carbon dioxide in the presence of a double metal cyanide catalyst, characterized in that (α) (α1) the DMC catalyst and one or more H-functional starter compounds are placed in a reactor, (α2) an inert gas, an inert gas/carbon dioxide mixture or carbon dioxide is passed through the reactor at a temperature of 50 to 200° C. and at the same time a reduced pressure (absolute) of 10 mbar to 800 mbar is established in the reactor by removal of the inert gas or carbon dioxide, (β) under an atmosphere of inert gas/carbon dioxide mixture or under a pure carbon dioxide atmosphere, alkylene oxide is added to the mixture from step (α) at temperatures of 50 to 200° C., and (γ) one or more alkylene oxides and carbon dioxide are metered into the mixture resulting from step (β).

15 Claims, No Drawings

METHOD FOR ACTIVATING DOUBLE METAL CYANIDE CATALYSTS FOR PRODUCING POLYETHER POLYOLS

RELATED APPLICATIONS

This application is a national stage application (under 35 U.S.C. §371) of PCT/EP2012/063979, filed Jul. 17, 2012, which claims benefit of European Application No. 11174410.8, filed Jul. 18, 2011, which is incorporated by reference herein.

The present invention relates to a process for the activation of double metal cyanide (DMC) catalysts under a carbon dioxide atmosphere for the preparation of polyethercarbonate polyols by the catalytic copolymerization of carbon dioxide ($CO_2$) with alkylene oxides in the presence of one or more H-functional starter substances.

The preparation of polyethercarbonate polyols by the catalytic reaction of alkylene oxides (epoxides) and carbon dioxide in the presence of H-functional starter substances ("starters") has been studied intensively for more than 40 years (e.g. Inoue et al., Copolymerization of Carbon Dioxide and Epoxide with Organometallic Compounds; Die Makromolekulare Chemie 130, 210-220, 1969). This reaction is shown diagrammatically in Scheme (I), where R is an organic radical such as alkyl, alkylaryl or aryl, each of which can also contain heteroatoms such as O, S, Si, etc., and e and f are integers, and where the product shown here in Scheme (I) for the polyethercarbonate polyol is only to be understood as meaning that blocks with the indicated structure can in principle be found in the polyethercarbonate polyol obtained, but that the sequence, number and length of the blocks and the OH functionality of the starter can vary and are not limited to the polyethercarbonate polyol shown in Scheme (I). This reaction (cf. Scheme (I)) is ecologically very advantageous because it represents the conversion of a greenhouse gas like $CO_2$ to a polymer. The cyclic carbonate shown in Scheme (I) (e.g. propylene carbonate for R=$CH_3$) is formed as a further product (actually a by-product).

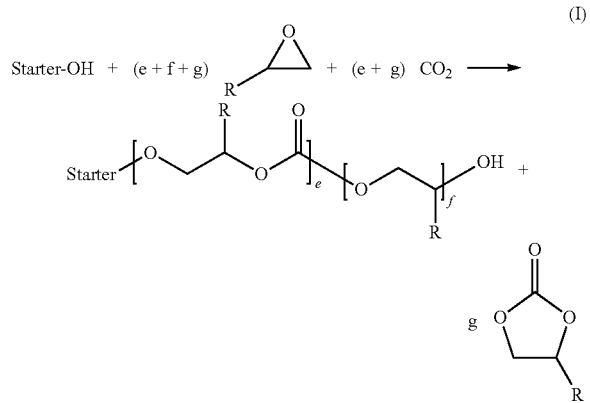

Activation in terms of the present invention is a step in which a fraction of the alkylene oxide compound, optionally in the presence of $CO_2$ and/or H-functional starter compound, is added to the DMC catalyst and the addition of the alkylene oxide compound is then interrupted; an evolution of heat, which can lead to a hotspot, is observed due to a subsequent exothermic chemical reaction, and a pressure drop in the reactor is observed due to the conversion of alkylene oxide and optionally $CO_2$. The addition of the fraction of alkylene oxide compound can optionally take place in several individual steps, the normal procedure being to wait each time until the evolution of heat has started. The process step of activation includes the period of time from the beginning of the addition of the fraction of alkylene oxide compound, optionally in the presence of $CO_2$, to the DMC catalyst up to the start of the evolution of heat. In the case where the fraction of alkylene oxide compound is added in several individual steps, the process step of activation includes all the periods of time during which the fractions of alkylene oxide compound have been added stepwise up to the start of the evolution of heat each time. In general, the activation step can be preceded by a step for drying of the DMC catalyst and optionally the H-functional starter compound at elevated temperature and/or reduced pressure, optionally with the passage of an inert gas through the reaction mixture.

EP-A 0 222 453 discloses a process for the preparation of polycarbonates from alkylene oxides and carbon dioxide using a catalyst system consisting of a DMC catalyst and a co-catalyst such as zinc sulfate. In this process the polymerization is initiated by bringing part of the alkylene oxide into contact with the catalyst system in a single step, after which the remainder of the alkylene oxide and the carbon dioxide are metered in simultaneously. The amount of 60 wt. % of alkylene oxide compound, relative to the H-functional starter compound, indicated in EP-A 0 222 453 for the activation step in Examples 1 to 7 is high and has the disadvantage of carrying a certain safety risk for industrial applications because of the high exothermicity of the homopolymerization of alkylene oxide compounds.

WO-A 2003/029325 discloses a process for the preparation of high-molecular aliphatic polyethercarbonate polyols (weight-average molecular weight greater than 30,000 g/mol) wherein a catalyst from the group comprising zinc carboxylate and multimetal cyanide compound is used; said catalyst is anhydrous and is initially brought into contact with at least a fraction of the carbon dioxide before the alkylene oxide is introduced. Final $CO_2$ pressures of up to 150 bar impose very high demands on the reactor and on safety. Even under the extremely high pressure of 150 bar, only approx. 33 wt. % $CO_2$ to a maximum of 42 wt. % of $CO_2$ was incorporated. The Examples presented describe the use of a solvent (toluene) that has to be separated off thermally after the reaction, requiring more time and increasing the cost. Moreover, the polymers have a very broad molecular weight distribution with a non-uniformity or polydispersity of 2.7 or more.

The object of the present invention was therefore to provide a process for the preparation of polyethercarbonate polyols which results in a high content of $CO_2$ incorporated into the polymer and at the same time effects a favourable selectivity (i.e. low ratio of cyclic carbonate to polyethercarbonate polyol) of the resulting polyethercarbonate polyol.

It has been found, surprisingly, that the object according to the invention is achieved by a process for the preparation of polyethercarbonate polyols from one or more H-functional starter substances, one or more alkylene oxides and carbon dioxide in the presence of a DMC catalyst, characterized in that the DMC catalyst is activated under a carbon dioxide atmosphere. The invention also provides the activation of DMC catalysts, the DMC catalyst being activated under a carbon dioxide atmosphere and optionally in the presence of one or more H-functional starter compounds.

The invention thus provides a process for the preparation of polyethercarbonate polyols from one or more H-functional starter compounds, one or more alkylene oxides and carbon dioxide in the presence of a DMC catalyst, characterized in that (α) (α1) the DMC catalyst and one or more H-functional starter compounds are placed in a reactor, (α2) an inert gas (e.g. nitrogen or a noble gas such as argon), an inert gas/carbon dioxide mixture or carbon dioxide is passed through the reactor at a temperature of 50 to 200° C., preferably of 80 to 160° C. and particularly preferably of 125 to 135° C., and at the same time a reduced pressure (absolute) of 10 mbar to 800 mbar, preferably of 40 mbar to 200 mbar, is established in the reactor by removal of the inert gas or carbon dioxide (e.g. with a pump) ("drying"), (β) under an atmosphere of inert gas/carbon dioxide mixture (e.g. nitrogen/carbon dioxide mixture or argon/carbon dioxide mixture) or under a carbon dioxide atmosphere, a fraction (based on the total amount of alkylene oxides used in steps (β) and (γ)) of one or more alkylene oxides is added to the mixture from step (α) at temperatures of 50 to 200° C., preferably of 80 to 160° C. and particularly preferably of 125 to 135° C. ("activation"), and (γ) one or more alkylene oxides and carbon dioxide are metered continuously into the mixture resulting from step (β) ("copolymerization"). The alkylene oxides used for the copolymerization can be identical to or different from those used in step (β).

In one preferred embodiment the amount of one or more alkylene oxides used in the activation of step (β) is 0.1 to 25.0 wt. %, preferably 1.0 to 20.0 wt. % and particularly preferably 2.0 to 16.0 wt. % (based on the amount of starter compound used in step (α)). The alkylene oxide can be added in one step or in several fractions stepwise. The DMC catalyst is preferably used in an amount such that the content of DMC catalyst in the resulting polyethercarbonate polyol is 10 to 10,000 ppm, particularly preferably 20 to 5000 ppm and very particularly preferably 50 to 500 ppm.

The invention thus also provides a process for the activation of DMC catalysts, characterized in that (α) (α1) the DMC catalyst and one or more H-functional starter compounds are placed in a reactor, (α2) an inert gas (e.g. nitrogen or a noble gas such as argon), an inert gas/carbon dioxide mixture or carbon dioxide is passed through the reactor at a temperature of 50 to 200° C., preferably of 80 to 160° C. and particularly preferably of 125 to 135° C., and at the same time a reduced pressure (absolute) of 10 mbar to 800 mbar, preferably of 40 mbar to 200 mbar, is established in the reactor by removal of the inert gas or carbon dioxide (e.g. with a pump), and (β) under an atmosphere of inert gas/carbon dioxide mixture (e.g. nitrogen/carbon dioxide mixture or argon/carbon dioxide mixture) or under a pure carbon dioxide atmosphere, alkylene oxide is added to the mixture from step (α) at temperatures of 50 to 200° C., preferably of 80 to 160° C. and particularly preferably of 125 to 135° C.

Step (α):

The individual components in step (α1) can be added simultaneously or successively in any desired order; preferably, in step (α1), the DMC catalyst is placed in the reactor first and the H-functional starter compound is added simultaneously or subsequently.

Another preferred embodiment provides a process wherein, in step (α), (α1) the H-functional starter compound or a mixture of at least two H-functional starter compounds is placed in the reactor, optionally under an inert gas atmosphere (e.g. nitrogen or argon), under an atmosphere of inert gas/carbon dioxide mixture or under a pure carbon dioxide atmosphere, particularly preferably under an inert gas atmosphere (e.g. nitrogen or argon), and (α2) an inert gas (e.g. nitrogen or a noble gas such as argon), an inert gas/carbon dioxide mixture or carbon dioxide, particularly preferably an inert gas (e.g. nitrogen or argon), is passed into the resulting mixture of DMC catalyst and one or more H-functional starter compounds at a temperature of 50 to 200° C., preferably of 80 to 160° C. and particularly preferably of 125 to 135° C., and at the same time a reduced pressure (absolute) of 10 mbar to 800 mbar, preferably of 40 mbar to 200 mbar, is established in the reactor by removal of the inert gas or carbon dioxide (e.g. with a pump), the double metal cyanide catalyst being added to the H-functional starter substance or the mixture of at least two H-functional starter substances in step (α1) or directly thereafter in step (α2).

The DMC catalyst can be added in solid form or as a suspension in an H-functional starter compound. If the DMC catalyst is added as a suspension, the latter is preferably added to the one or more H-functional starter compounds in step (α1).

Step (β):

The establishing of an atmosphere of inert gas/carbon dioxide mixture (e.g. nitrogen/carbon dioxide mixture or argon/carbon dioxide mixture) or a pure carbon dioxide atmosphere, and the metering of one or more alkylene oxides, can in principle be carried out in a variety of ways. The admission pressure is preferably established by introducing carbon dioxide, the pressure (absolute) being 10 mbar to 100 bar, preferably 100 mbar to 50 bar and particularly preferably 500 mbar to 50 bar. The metering of the alkylene oxide can start from the vacuum or at a preselected admission pressure. The total pressure (absolute) of the atmosphere of inert gas/carbon dioxide mixture (e.g. nitrogen/carbon dioxide mixture or argon/carbon dioxide mixture) or of a pure carbon dioxide atmosphere, and optionally alkylene oxide, in step (β) is established in the range preferably from 10 mbar to 100 bar, particularly preferably from 100 mbar to 50 bar and very particularly preferably from 500 mbar to 50 bar. Optionally, during or after the metering of the alkylene oxide, the pressure is adjusted by introducing more carbon dioxide, the pressure (absolute) being 10 mbar to 100 bar, preferably 100 mbar to 50 bar and particularly preferably 500 mbar to 50 bar.

Step (γ):

The metering of the one or more alkylene oxides and the carbon dioxide can take place simultaneously, alternately or sequentially, it being possible for the total amount of carbon dioxide to be added all at once or metered in over the reaction time. During the addition of the alkylene oxide, the $CO_2$ pressure can be raised or lowered gradually or stepwise or left as it is. Preferably, the total pressure is kept constant during the reaction by topping up with carbon dioxide. The metering of the one or more alkylene oxides or the $CO_2$ takes place simultaneously, alternately or sequentially in relation to the metering of the carbon dioxide. It is possible to meter the alkylene oxide in at a constant rate, to raise or lower the metering rate gradually or stepwise, or to add the alkylene oxide in portions. Preferably, the alkylene oxide is added to the reaction mixture at a constant metering rate. If several alkylene oxides are used to synthesize the polyethercarbonate polyols, the alkylene oxides can be metered in individually or as a mixture. The metering of the alkylene oxides can take place simultaneously, alternately or sequentially by means of separate metering (addition) operations or by means of one or more metering operations, it being possible for the alkylene oxides to be metered in individually or as a mixture. By varying the type and/or order of metering of the alkylene oxides and/or carbon dioxide, it is possible to synthesize random, alternating, block or gradient polyethercarbonate polyols.

It is preferable to use an excess of carbon dioxide based on the calculated amount of incorporated carbon dioxide in the polyethercarbonate polyol, an excess of carbon dioxide being advantageous due to its inertness. The amount of carbon dioxide can be determined from the total pressure under the particular reaction conditions. The range from 0.01 to 120 bar, preferably from 0.1 to 110 bar and particularly preferably from 1 to 100 bar has proved advantageous as the total pressure (absolute) for the copolymerization to prepare the polyethercarbonate polyols. The carbon dioxide can be introduced continuously or batchwise. This depends on how quickly the alkylene oxides and the $CO_2$ are consumed and whether the product is optionally to contain $CO_2$-free polyether blocks or blocks with different $CO_2$ contents. The amount of carbon dioxide (given as pressure) can likewise vary when the alkylene oxides are added. According to the chosen reaction conditions, it is possible to introduce the $CO_2$ into the reactor in the gaseous, liquid or supercritical state. $CO_2$ can also be fed into the reactor as a solid and then change into the gaseous, dissolved, liquid and/or supercritical state under the chosen reaction conditions.

For the process according to the invention it has further been found that the copolymerization (step ($\gamma$)) to prepare the polyethercarbonate polyols is advantageously carried out at 50 to 150° C., preferably at 60 to 145° C., particularly preferably at 70 to 140° C. and very particularly preferably at 90 to 130° C. Below 50° C. the reaction only proceeds very slowly. At temperatures above 150° C. the amount of unwanted by-products increases sharply.

In steps ($\beta$) and/or ($\gamma$) the carbon dioxide is preferably introduced into the mixture by
 (i) feeding gas into the reaction mixture from underneath the reactor (e.g. via an inlet tube or a gas dispersion ring with the gas being led underneath the agitator blade) and, depending on the gas load, optionally in combination with a gas dispersion agitator (e.g. disk agitator, straight-blade turbine, Rushton turbine (e.g. Lightnin R-100®, Ekato PHASE-JET®, Smith-Turbine® from Philadelphia Mixing Solutions, Chemineer BT-6® or CD-6® agitator blades)), there optionally being further agitating elements (of any desired type, e.g. turbines that convey axially according to the slenderness ratio of the reactor, or agitating elements that support heat transfer to inner-lying cooling surfaces and/or promote mass transfer over the liquid surface) arranged on the agitator shaft; a combination of two or more agitating elements has the technical advantage of being able to improve the mass transfer of the gas into the liquid phase on the surface of the reaction mixture;
 (ii) using a hollow shaft agitator (i.e. using the principle of the air jet pump), e.g. as a tubular agitator, pitched-blade turbine with hollow blades, Ekato GASJET®, PREMEX laboratory gas dispersion agitator of the "br" series, or laboratory gas dispersion agitator from Parr Instruments; the effect of using a hollow shaft agitator is that the gas phase accumulating in the gas space is aspirated through a hollow shaft and fed back into the reaction mixture from underneath;
 (iii) combining the metering operations according to (i) and (ii), which is advantageous for operating with a constant filling level in the reactor; for example, the metering operations according to (i) and (ii) can be combined in such a way that the feeding of gas into the reaction mixture from underneath the reactor according to one of the possibilities mentioned under (i) is combined with a hollow shaft agitator according to (ii) (e.g. a gas dispersion agitator with an air jet pump arranged on top as a second dispersion stage), preferably in such a way that the introduction of the gas from below takes place underneath the hollow shaft agitator; and/or
 (iv) feeding gas over the liquid surface using appropriate agitating elements, typically of multistage design (e.g. MIG or Ekato MIG/INTERMIG®), or by means of agitating elements acting on the liquid surface (e.g. gate agitator).

The agitation conditions are to be designed by those skilled in the art on a case-by-case basis depending on the reaction conditions (e.g. liquid phase viscosity, gas load, surface tension) and according to the state of the art of agitation, e.g. in order to be sure of avoiding the flooding of an agitating element fed with gas from underneath, or to ensure the desired power input and/or mass transfer in the gas dispersion state. The reactor optionally contains internal fittings such as flow spoilers and/or cooling surfaces (in the form of a tube, a coil, plates or the like), a gas dispersion ring and/or an inlet tube. Other heat exchange surfaces can be arranged in a pump circuit, in which case the reaction mixture is conveyed by suitable pumps (e.g. screw pump, centrifugal pump or gear pump). Here the circulating stream can be recycled into the reactor, e.g. also via an injector nozzle, whereby part of the gas space is aspirated and intimately mixed with the liquid phase for the purpose of improving the mass transfer.

The feeding of gas into the reaction mixture in the reactor according to (i) preferably takes place via a gas dispersion ring, a gas dispersion nozzle or a gas inlet tube. The gas dispersion ring is preferably an annular arrangement or two or more annular arrangements of gas dispersion nozzles preferably located on the bottom and/or side wall of the reactor.

The hollow shaft agitator is preferably an agitator in which the gas is introduced into the reaction mixture through a hollow shaft of the agitator. As the agitator rotates in the reaction mixture (i.e. during mixing), a pressure reduction is created at the end of the agitator blade connected to the hollow shaft, whereupon the gas phase (containing $CO_2$ and optionally unconsumed alkylene oxide) is aspirated out of the gas space above the reaction mixture and passed through the hollow shaft of the agitator into the reaction mixture.

The feeding of gas into the reaction mixture according to (i), (ii), (iii) or (iv) can be effected in each case with freshly metered carbon dioxide (and/or be combined with aspiration of the gas out of the gas space above the reaction mixture and subsequent recompression of the gas). For example, the gas which has been aspirated out of the gas space above the reaction mixture and compressed is introduced into the reaction mixture according to (i), (ii), (iii) and/or (iv), optionally mixed with fresh carbon dioxide and/or alkylene oxide. Preferably, the pressure drop arising from the incorporation of carbon dioxide and alkylene oxide into the reaction product during copolymerization is compensated with freshly metered carbon dioxide.

The alkylene oxide can be introduced separately or together with the $CO_2$, either via the liquid surface or direct into the liquid phase. The alkylene oxide is preferably introduced direct into the liquid phase because this has the advantage of a rapid and thorough mixing of the incorporated alkylene oxide with the liquid phase, thereby avoiding concentration hotspots of alkylene oxide. The introduction into the liquid phase can be effected via one or more inlet tubes, one or more nozzles or one or more annular arrangements of multiple metering points preferably located on the bottom and/or side wall of the reactor.

The three steps α, β and γ can be carried out in the same reactor or separately in different reactors. Particularly preferred types of reactor are agitated tanks, tubular reactors and loop reactors. If reaction steps α, β and γ are carried out in different reactors, a different type of reactor can be used for each step.

Polyethercarbonate polyols can be prepared in an agitated tank, the latter being cooled via the reactor jacket, internal cooling surfaces and/or cooling surfaces located in a pump circuit, depending on the embodiment and mode of operation. In both semi-batch use, where the product is not removed until after the reaction has ended, and continuous use, where the product is removed continuously, particular attention must be paid to the metering rate of the alkylene oxide. It is to be adjusted so that the alkylene oxides react sufficiently rapidly despite the inhibitory effect of the carbon dioxide. The concentration of free alkylene oxides in the reaction mixture during the activation step (step β) is preferably >0 to 100 wt. %, particularly preferably >0 to 50 wt. % and very particularly preferably >0 to 20 wt. % (based in each case on the weight of the reaction mixture). The concentration of free alkylene oxides in the reaction mixture during the reaction (step γ) is preferably >0 to 40 wt. %, particularly preferably >0 to 25 wt. % and very particularly preferably >0 to 15 wt. % (based in each case on the weight of the reaction mixture).

Another possible embodiment in the agitated tank (batch) for the copolymerization (step γ) is characterized in that one or more H-functional starter compounds are metered continuously into the reactor during the reaction. In one mode of carrying out the process in the semi-batch operation, the amount of H-functional starter compounds metered continuously into the reactor during the reaction is preferably at least 20 mol % equivalent, particularly preferably 70 to 95 mol % equivalent (based in each case on the total amount of H-functional starter compounds). In one continuous mode of carrying out the process, the amount of H-functional starter compounds metered continuously into the reactor during the reaction is preferably at least 80 mol % equivalent, particularly preferably 95 to 105 mol % equivalent (based in each case on the total amount of H-functional starter compounds).

In one preferred embodiment, the catalyst/starter mixture activated according to steps α and β is reacted further with alkylene oxides and carbon dioxide in the same reactor. In another preferred embodiment, the catalyst/starter mixture activated according to steps α and β is reacted further with alkylene oxides and carbon dioxide a in a different reaction vessel (e.g. an agitated tank, tubular reactor or loop reactor). In another preferred embodiment, the catalyst/starter mixture dried according to step α is reacted with alkylene oxides and carbon dioxide in a different reaction vessel (e.g. an agitated tank, tubular reactor or loop reactor) according to steps β and γ.

If the reaction is carried out in a tubular reactor, the catalyst/starter mixture dried according to step α or the catalyst/starter mixture activated according to steps α and β, and optionally other starters as well as the alkylene oxides and carbon dioxide, are pumped continuously through a tube. If a catalyst/starter mixture dried according to step α is used, the activation according to step β takes place in the first part of the tubular reactor and the copolymerization according to step β in the second part of the tubular reactor. The molar ratios of the reactants vary according to the desired polymer. In one preferred embodiment, the carbon dioxide is metered in its liquid or supercritical form so as to optimize the miscibility of the components. The carbon dioxide can be introduced into the reactor at its inlet and/or via metering points arranged along the reactor. A fraction of the epoxide can be introduced at the reactor inlet. The remainder of the epoxide is preferably introduced into the reactor via several metering points arranged along the reactor. It is advantageous to incorporate mixing elements to improve the thorough mixing of the reactants, examples being those marketed by Ehrfeld Mikrotechnik BTS GmbH, or mixing/heat exchange elements to simultaneously improve thorough mixing and heat dissipation. Preferably, $CO_2$ and/or alkylene oxide metered in through the mixing elements are mixed with the reaction mixture. In one alternative embodiment, different volume elements of the reaction mixture are mixed with one another.

Loop reactors can also be used to prepare polyethercarbonate polyols. These generally include reactors with internal and/or external material recycling (optionally with heat exchange surfaces arranged in the circuit), such as a jet loop or venturi loop reactor, which can also be operated continuously, or a tubular reactor designed as a loop with suitable devices for circulating the reaction mixture, or a loop of several tubular reactors connected in series or several agitated tanks connected in series.

To achieve full conversion, another tank or a tube ("detention tube"), in which residual concentrations of free alkylene oxides present after the reaction react, is commonly connected downstream of the reaction apparatus in which step γ is carried out. Preferably, the pressure in this downstream reactor is the same as that in the reaction apparatus in which reaction step γ is carried out. However, the pressure in the downstream reactor can also be chosen higher or lower. In another preferred embodiment, all or some of the carbon dioxide is exhausted after reaction step γ and the downstream reactor is operated at normal pressure or a slight excess pressure. The temperature in the downstream reactor is preferably 10 to 150° C., particularly preferably 20 to 100° C. At the end of the downstream reactor the reaction mixture preferably contains less than 0.05 wt. % of alkylene oxide.

The polyethercarbonate polyols obtained according to the invention preferably have an OH functionality (i.e. mean number of OH groups per molecule) of at least 0.8, preferably of 1 to 8, particularly preferably of 1 to 6 and very particularly preferably of 2 to 4. The molecular weight of the polyethercarbonate polyols obtained is at least 400 g/mol, preferably 400 to 1,000,000 g/mol and particularly preferably 500 to 60,000 g/mol.

The process according to the invention can generally be carried out using alkylene oxides (epoxides) having 2-45 carbon atoms. Examples of alkylene oxides having 2-45 carbon atoms are one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, monoepoxy or polyepoxy fats as mono-, di- and triglycerides, epoxy fatty acids, $C_1$-$C_{24}$ esters of epoxy fatty acids, epichlorohydrin, glycidol, and glycidol derivatives such as methyl glycidyl ether, ethyl glycidyl ether, 2-ethylhexyl glycidyl ether, allyl glycidyl ether, glycidyl methacrylate and epoxy-functional alkoxysilanes like 3-glycidyloxypropyltrimethoxysilane, 3-glycidyloxypropyltriethoxysilane, 3-glycidyl-oxypropyltripropoxysilane, 3-glycidyloxypropylmethyldimethoxysilane, 3-glycidyloxypropylethyldiethoxysilane and 3-glycidyloxypropyltriisopropoxysilane. The alkylene oxides used are preferably ethylene oxide and/or propylene oxide, especially propylene oxide.

Suitable H-functional starter compounds which can be used are compounds with H atoms that are active for alkoxylation. Examples of groups with H atoms that are active for alkoxylation are —OH, —$NH_2$ (primary amines), —NH— (secondary amines), —SH and —$CO_2H$; —OH and —$NH_2$ are preferred and —OH is particularly preferred. Examples of H-functional starter substances used are one or more compounds selected from the group comprising monohydric or polyhydric alcohols, polybasic amines, polyhydric thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine® from Huntsman, such as D-230, D-400, D-2000, T-403, T-3000 or T-5000, or corresponding products from BASF, such as polyetheramine D230, D400, D200, T403 or T5000), polytetrahydrofurans (e.g. PolyTHF® from BASF, such as PolyTHF® 250, 650S, 1000, 1000S, 1400, 1800 or 2000), polytetrahydrofuranamines (BASF product polytetrahydrofuranamine 1700), polyetherthiols, polyacrylate polyols, castor oil, ricinoleic acid mono- or diglyceride, fatty acid monoglycerides, chemically modified fatty acid mono-, di- and/or triglycerides, and fatty acid $C_1$-$C_{24}$-alkyl esters containing an average of at least 2 OH groups per molecule. Examples of fatty acid $C_1$-$C_{24}$-alkyl esters containing an average of at least 2 OH groups per molecule are commercially available products such as Lupranol Balance® (BASF AG), various types of Merginol® (Hobum Oleochemicals GmbH), various types of Sovermol® (Cognis Deutschland GmbH & Co. KG) and various types of Soyol®TM (USSC Co.).

Monofunctional starter compounds which can be used are alcohols, amines, thiols and carboxylic acids. The following monofunctional alcohols can be used: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. The following monofunctional amines are suitable: butylamine, tertbutylamine, pentylamine, hexylamine, aniline, aziridine, pyrrolidine, piperidine, morpholine. The following monofunctional thiols can be used: ethanethiol, 1-propanethiol, 2-propanethiol, 1-butanethiol, 3-methyl-1-butanethiol, 2-butene-1-thiol, thiophenol. The following monofunctional carboxylic acids may be mentioned: formic acid, acetic acid, propionic acid, butyric acid, fatty acids such as stearic acid, palmitic acid, oleic acid, linoleic acid and linolenic acid, benzoic acid, acrylic acid.

Examples of polyhydric alcohols suitable as H-functional starter substances are dihydric alcohols (e.g. ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (e.g. 3-methyl-1,5-pentanediol), 1,6-hexanediol, 1,8-octanediol, 1,10-decanediol, 1,12-dodecanediol, bis-(hydroxymethyl) cyclohexanes (e.g. 1,4-bis(hydroxymethyl)cyclohexane), triethylene glycol, tetraethylene glycol, polyethylene glycols, dipropylene glycol, tripropylene glycol, polypropylene glycols, dibutylene glycol, polybutylene glycols); trihydric alcohols (e.g. trimethylolpropane, glycerol, trishydroxyethyl isocyanurate, castor oil); tetrahydric alcohols (e.g. pentaerythritol); polyalcohols (e.g. sorbitol, hexitol, sucrose, starch, starch hydrolysates, cellulose, cellulose hydrolysates, hydroxy-functionalized fats and oils, especially castor oil); and any modified products of the aforesaid alcohols containing different amounts of ε-caprolactone.

The H-functional starter substances can also be selected from the class of substances comprising the polyether polyols, especially those with a molecular weight $M_n$ ranging from 100 to 4000 g/mol. Preferred polyether polyols are those made up of repeating ethylene oxide and propylene oxide units, preferably with a proportion of 35 to 100% of propylene oxide units and particularly preferably with a proportion of 50 to 100% of propylene oxide units. They can be random copolymers, gradient copolymers or alternating or block copolymers of ethylene oxide and propylene oxide. Examples of suitable polyether polyols made up of repeating propylene oxide and/or ethylene oxide units are the Desmophen®, Acclaim®, Arcol®, Baycoll®, Bayfill®, Bayflex®, Baygal®, PET® and Polyether Polyols from Bayer MaterialScience AG (e.g. Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Examples of other suitable homo-polyethylene oxides are the Pluriol® E brands from BASF SE, examples of suitable homo-polypropylene oxides are the Pluriol® P brands from BASF SE, and examples of suitable mixed copolymers of ethylene oxide and propylene oxide are the Pluronic® PE or Pluriol® RPE brands from BASF SE.

The H-functional starter substances can also be selected from the class of substances comprising the polyester polyols, especially those with a molecular weight ranging from 200 to 4500 g/mol. The polyester polyols used are at least difunctional polyesters and preferably consist of alternating acid and alcohol units. Examples of acid components used are succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of said acids and/or anhydrides. Examples of alcohol components used are ethanediol, 1,2-propanediol, 1,3-propanediol, 1,4-butanediol, 1,5-pentanediol, neopentyl glycol, 1,6-hexanediol, 1,4-bis(hydroxymethyl)-cyclohexane, diethylene glycol, dipropylene glycol, trimethylolpropane, glycerol, pentaerythritol or mixtures of said alcohols. If dihydric or polyhydric polyether polyols are used as the alcohol component, polyesterether polyols are obtained which can also be used as starter substances for preparing the polyethercarbonate polyols. It is preferable to use polyether polyols of $M_n$=150 to 2000 g/mol to prepare the polyesterether polyols.

Other H-functional starter substances which can be used are polycarbonatediols, especially those with a molecular weight $M_n$ ranging from 150 to 4500 g/mol, preferably from 500 to 2500 g/mol, which are prepared e.g. by reacting phosgene, dimethyl carbonate, diethyl carbonate or diphenyl carbonate with difunctional alcohols, polyester polyols or polyether polyols. Examples of polycarbonates can be found e.g. in EP-A 1359177. Examples of polycarbonatediols which can be used are the Desmophen® C types from Bayer MaterialScience AG, such as Desmophen® C 1100 or Desmophen® C 2200.

In another embodiment of the invention, polyethercarbonate polyols can be used as H-functional starter substances. The polyethercarbonate polyols obtainable by the process according to the invention described here are used in particular. These polyethercarbonate polyols used as H-functional starter substances are previously prepared for this purpose in a separate reaction step.

The H-functional starter substances generally have an OH functionality (i.e. number of H atoms per molecule that are active for polymerization) of 1 to 8, preferably of 2 to 6 and particularly preferably of 2 to 4. The H-functional starter substances are used either individually or as a mixture of at least two H-functional starter substances.

Preferred H-functional starter substances are alcohols of general formula (II):

$$HO-(CH_2)_x-OH \qquad (II)$$

where x is a number from 1 to 20, preferably an even number from 2 to 20. Examples of alcohols of formula (II) are ethylene glycol, 1,4-butanediol, 1,6-hexanediol, 1,8-octanediol, 1,10-decanediol and 1,12-dodecanediol. Other preferred H-functional starter substances are neopentyl glycol, trimethylolpropane, glycerol, pentaerythritol, and reaction products of the alcohols of formula (II) with ε-caprolactone, e.g. reaction products of trimethylolpropane with ε-caprolactone, reaction products of glycerol with ε-caprolactone and reaction products of pentaerythritol with ε-caprolactone. Other H-functional starter substances which are preferably used are water, diethylene glycol, dipropylene glycol, castor oil, sorbitol, and polyether polyols made up of repeating polyalkylene oxide units.

Particularly preferably, the H-functional starter substances are one or more compounds selected from the group comprising ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane and di- and trifunctional polyether polyols, the polyether polyol being made up of a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ ranging from 62 to 4500 g/mol, especially a molecular weight $M_n$ ranging from 62 to 3000 g/mol.

The polyethercarbonate polyols are prepared by the catalytic addition of carbon dioxide and alkylene oxides on to H-functional starter substances. In terms of the invention, "H-functional" is understood as meaning the number of H atoms per molecule of starter compound that are active for alkoxylation.

DMC catalysts for use in the homopolymerization of alkylene oxides are known in principle from the state of the art (cf., for example, U.S. Pat. No. 3,404,109, U.S. Pat. No. 3,829,505, U.S. Pat. No. 3,941,849 and U.S. Pat. No. 5,158,922). DMC catalysts described e.g. in U.S. Pat. No. 5,470,813, EP-A 700 949, EP-A 743 093, EP-A 761 708, WO 97/40086, WO 98/16310 and WO 00/47649 have a very high activity and enable polyethercarbonate polyols to be prepared with very low catalyst concentrations. Typical examples are the highly active DMC catalysts described in EP-A 700 949, which, in addition to a double metal cyanide compound (e.g. zinc hexacyanocobaltate(III)) and an organic complexing ligand (e.g. tert-butanol), also contain a polyether with a number-average molecular weight greater than 500 g/mol.

The DMC catalysts according to the invention are preferably obtained by a process in which (a) in the first step, an aqueous solution of a metal salt is reacted with an aqueous solution of a metal cyanide salt in the presence of one or more organic complexing ligands, e.g. an ether or alcohol, (b) in the second step, the solid is separated from the suspension obtained in (i) by known techniques (such as centrifugation or filtration), (c) optionally, in a third step, the isolated solid is washed with an aqueous solution of an organic complexing ligand (e.g. by resuspension and then re-isolation by filtration or centrifugation), and (d) the solid obtained is then dried, optionally after pulverization, at temperatures generally of 20-120° C. and at pressures generally of 0.1 mbar to normal pressure (1013 mbar), one or more organic complexing ligands, preferably in excess (based on the double metal cyanide compound), and optionally other complexing components, being added in the first step or immediately after the precipitation of the double metal cyanide compound (second step).

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt, e.g. potassium hexacyanocobaltate) and potassium hexacyanocobaltate are mixed and dimethoxyethane (glyme) or tert-butanol (preferably in excess, based on zinc hexacyanocobaltate) is then added to the suspension formed.

Metal salts suitable for preparing the double metal cyanide compounds preferably have general formula (III):

$$M(X)_n \qquad (III)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, M preferably being $Zn^{2+}$, $Fe^{2+}$, $Co^{2+}$ or $Ni^{2+}$;

X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate; and n is 2 when X=halide, hydroxide, carboxylate, cyanate, thiocyanate, isocyanate, isothiocyanate or nitrate, or suitable metal salts have general formula (IV):

$$M_r(X)_3 \qquad (IV)$$

where

M is selected from the metal cations $Fe^{3+}$, $Al^{3+}$, $Co^{3+}$ and $Cr^{3+}$;

X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate; and r is 1 when X=halide, hydroxide, carboxylate, cyanate, thiocyanate, isocyanate, isothiocyanate or nitrate, or suitable metal salts have general formula (V):

$$M(X)_s \qquad (V)$$

where

M is selected from the metal cations $Mo^{4+}$, $V^{4+}$ and $W^{4+}$;

X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate; and
s is 4 when X=halide, hydroxide, carboxylate, cyanate, thiocyanate, isocyanate, isothiocyanate or nitrate,
or suitable metal salts have general formula (VI):

$$M(X)_t \quad (VI)$$

where
M is selected from the metal cations $Mo^{6+}$ and $W^{6+}$;
X are one or more (i.e. different) anions, preferably an anion selected from the group comprising halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate; and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have general formula (VII):

$$(Y)_a M'(CN)_b (A)_c \quad (VII)$$

where
M' is selected from one or more metal cations from the group comprising Fe(II), Fe(III), Co(II), Co(III), Cr(II), Cr(III), Mn(II), Mn(III), Ir(III), Ni(II), Rh(III), Ru(II), V(IV) and V(V), M' preferably being one or more metal cations from the group comprising Co(II), Co(III), Fe(II), Fe(III), Cr(III), Ir(III) and Ni(II);
Y is selected from one or more metal cations from the group comprising alkali metals (i.e. $Li^+$, $Na^+$, $K^+$, $Rb^+$) and alkaline earth metals (i.e. $Be^{2+}$, $Mg^{2+}$, $Ca^{2+}$, $Sr^{2+}$, $Ba^{2+}$);
A is selected from one or more anions from the group comprising halides (i.e. fluoride, chloride, bromide, iodide), hydroxide, sulfate, carbonate, cyanate, thiocyanate, isocyanate, isothiocyanate, carboxylate, azide, oxalate and nitrate; and
a, b and c are integers, the values of a, b and c being chosen so that the metal cyanide salt is electrically neutral; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds contained in the DMC catalysts according to the invention are compounds of general formula (VIII):

$$M_x[M'_{x'}(CN)_y]_z \quad (VIII)$$

where
M is as defined in formulae (II) to (VI);
M' is as defined in formula (VII); and
x, x', y and z are integers and are chosen so that the double metal cyanide compound is electrically neutral.
Preferably:
x=3, x'=1, y=6 and z=2;
M=Zn(II), Fe(II), Co(II) or Ni(II); and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Other examples of suitable double metal cyanide compounds can be found e.g. in U.S. Pat. No. 5,158,922 (column 8, lines 29-66). It is particularly preferable to use zinc hexacyanocobaltate(III).

The organic complexing ligands added in the preparation of the DMC catalysts are disclosed e.g. in U.S. Pat. No. 5,158,922 (cf. especially column 6, lines 9 to 65), U.S. Pat. No. 3,404,100, U.S. Pat. No. 3,829,505, U.S. Pat. No. 3,941, 849, EP-A 700 949, EP-A 761 708, JP 4 145 123, U.S. Pat. No. 5,470,813, EP-A 743 093 and WO-A 97/40086). For example, water-soluble organic compounds with heteroatoms, such as oxygen, nitrogen, phosphorus or sulfur, which can form complexes with the double metal cyanide compound are used as organic complexing ligands. Preferred organic complexing ligands are alcohols, aldehydes, ketones, ethers, esters, amides, ureas, nitriles, sulfides and mixtures thereof. Particularly preferred organic complexing ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), and compounds containing both aliphatic or cycloaliphatic ether groups and aliphatic hydroxyl groups (e.g. ethylene glycol mono-tert-butyl ether, diethylene glycol mono-tert-butyl ether, tripropylene glycol monomethyl ether and 3-methyl-3-oxetanemethanol). Very particularly preferred organic complexing ligands are selected from one or more compounds from the group comprising dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, one or more complexing components from the following classes of compounds are used in the preparation of the DMC catalysts according to the invention: polyethers, polyesters, polycarbonates, polyalkylene glycol sorbitan esters, polyalkylene glycol glycidyl ethers, polyacrylamide, poly(acrylamide-co-acrylic acid), polyacrylic acid, poly (acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinyl-pyrrolidone-co-acrylic acid), polyvinyl methyl ketone, poly(4-vinylphenol), poly-(acrylic acid-co-styrene), oxazoline polymers, polyalkyleneimines, maleic acid and maleic anhydride copolymers, hydroxyethyl cellulose and polyacetals, or glycidyl ethers, glycosides, carboxylic acid esters of polyhydric alcohols, gallic acids or their salts, esters or amides, cyclodextrins, phosphorus compounds, α,β-unsaturated carboxylic acid esters or ionic surface-active compounds.

Preferably, in the first step of the preparation of the DMC catalysts according to the invention, the aqueous solution of the metal salt (e.g. zinc chloride), used in stoichiometric excess (at least 50 mol %, based on the metal cyanide salt, i.e. a molar ratio of metal salt to metal cyanide salt of at least 2.25 to 1.00) is reacted with the aqueous solution of the metal cyanide salt (e.g. potassium hexacyanocobaltate) in the presence of the organic complexing ligand (e.g. tert-butanol) to form a suspension containing the double metal cyanide compound (e.g. zinc hexacyanocobaltate), water, excess metal salt and the organic complexing ligand.

The organic complexing ligand can be present in the aqueous solution of the metal salt and/or the aqueous solution of the metal cyanide salt, or it is added immediately to the suspension obtained after precipitation of the double metal cyanide compound. It has been found advantageous to mix the aqueous solutions of the metal salt and metal cyanide salt and the organic complexing ligand with vigorous agitation. Optionally, the suspension formed in the first step is then treated with another complexing component, the latter preferably being used in a mixture with water and organic complexing ligand. A preferred procedure for carrying out the first step (i.e. preparation of the suspension) involves the use of a mixing nozzle, particularly preferably a jet disperser as described in WO-A 01/39883.

In the second step, the isolation of the solid (i.e. the precursor of the catalyst according to the invention) from the suspension is effected by known techniques such as centrifugation or filtration.

In one preferred embodiment, the isolated solid is then washed, in a third process step, with an aqueous solution of the organic complexing ligand (e.g. by resuspension and then re-isolation by filtration or centrifugation). This makes it possible e.g. to remove water-soluble by-products, such as potassium chloride, from the catalyst according to the invention. Preferably, the amount of organic complexing ligand in the aqueous wash solution is between 40 and 80 wt. %, based on the total solution.

Optionally, another complexing component, preferably in the range between 0.5 and 5 wt. %, based on the total solution, is added to the aqueous wash solution in the third step.

It is moreover advantageous to wash the isolated solid more than once. Preferably, a first washing step (iii-1) is carried out with an aqueous solution of the unsaturated alcohol (e.g. by resuspension and then re-isolation by filtration or centrifugation) in order e.g. to remove water-soluble by-products, such as potassium chloride, from the catalyst according to the invention. Particularly preferably, the amount of unsaturated alcohol in the aqueous wash solution is between 40 and 80 wt. %, based on the total solution of the first washing step. In the other washing steps (iii-2), either the first washing step is repeated one or more times, preferably one to three times, or, preferably, a non-aqueous solution, e.g. a mixture or solution of unsaturated alcohol and another complexing component (preferably in the range between 0.5 and 5 wt. %, based on the total amount of wash solution of step (iii-2)), is used as the wash solution and the solid is washed therewith one or more times, preferably one to three times.

The isolated and optionally washed solid is then dried, optionally after pulverization, at temperatures generally of 20-100° C. and at pressures generally of 0.1 mbar to normal pressure (1013 mbar).

A preferred procedure for isolating the DMC catalysts according to the invention from the suspension, by filtration, filter cake washing and drying, is described in WO-A 01/80994.

The polyethercarbonate polyols obtainable by the process according to the invention can be processed without problems, in particular by conversion with di- and/or polyisocyanates to polyurethanes, especially flexible polyurethane foams. The polyethercarbonate polyols used for polyurethane applications are preferably those based on an H-functional starter compound having a functionality of at least 2. Furthermore, the polyethercarbonate polyols obtainable by the process according to the invention can be used in applications such as detergent and cleaning agent formulations, drilling fluids, fuel additives, ionic and non-ionic surfactants, lubricants, process chemicals for paper or textile production, or cosmetic formulations. It is known to those skilled in the art that, depending on the particular field of application, the polyethercarbonate polyols to be used must satisfy certain material properties, e.g. molecular weight, viscosity, functionality and/or hydroxyl number.

EXAMPLES

H-functional starter compounds (starters) used:

PET-1: difunctional poly(oxypropylene)polyol with an OH number of 112 $mg_{KOH}/g$ PET-2: difunctional poly(oxypropylene)polyol with an OH number of 261 $mg_{KOH}/g$ PET-3: trifunctional poly(oxypropylene)polyol with an OH number of 400 $mg_{KOH}/g$ The DMC catalyst was prepared according to Example 6 of WO-A 01/80994.

The 300 ml pressurized reactor used in the Examples had a height (internal) of 10.16 cm and an internal diameter of 6.35 cm. The reactor was fitted with an electric heating jacket (510 watt maximum heating capacity). The counter cooling consisted of a U-shaped dip tube of external diameter 6 mm which projected into the reactor to within 5 mm of the bottom and through which cooling water at approx. 10° C. was passed. The water stream was switched on and off by means of a solenoid valve. The reactor was also fitted with an inlet tube and a temperature probe of diameter 1.6 mm, both of which projected into the reactor to within 3 mm of the bottom.

During the activation [step (β)] the electric heating jacket was on average at approx. 20% of its maximum heating capacity. Due to regulation, the heating capacity varied by ±5% of the maximum value. The onset of an increased evolution of heat in the reactor caused by the rapid conversion of propylene oxide during the activation of the catalyst [step (β)] was observed in a reduction of the heating capacity of the heating jacket, the switching-on of the counter cooling and, if appropriate, a temperature rise in the reactor. The onset of an evolution of heat in the reactor caused by the continuous conversion of propylene oxide during the reaction [step (γ)] led to a lowering of the capacity of the heating jacket to approx. 8% of the maximum value. Due to regulation, the heating capacity varied by ±5% of the maximum value.

The hollow shaft agitator used in the Examples was one in which the gas was introduced into the reaction mixture through a hollow shaft of the agitator. The agitating body attached to the hollow shaft had four arms of diameter 35 mm and height 14 mm. Two gas outlets of diameter 3 mm were attached to each end of the arm. As the agitator rotated, a pressure reduction was created such that the gas above the reaction mixture ($CO_2$ and optionally alkylene oxide) was aspirated and passed through the hollow shaft of the agitator into the reaction mixture.

The impeller agitator used in the Examples was a pitched-blade turbine in which a total of two agitator stages, each with four agitator blades (45°) of diameter 35 mm and height 10 mm, were attached to the agitator shaft at a distance of 7 mm.

In addition to the cyclic propylene carbonate, the copolymerization produced the polyethercarbonate polyol containing on the one hand polycarbonate units shown in formula (IXa):

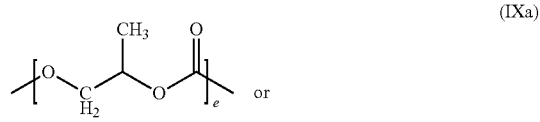

(IXa)

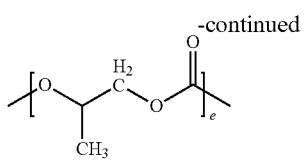

and on the other hand polyether units shown in formula (IXb):

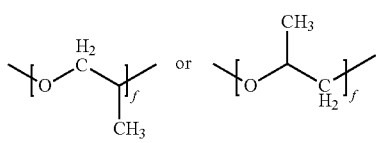

The reaction mixture was characterized by $^1$H-NMR spectroscopy and gel permeation chromatography:

The ratio of the amount of cyclic propylene carbonate to polyethercarbonate polyol (selectivity), the molar ratio of carbonate groups to ether groups in the polyethercarbonate polyol (ratio e/f) and the proportion of converted propylene oxide (C in mol %) were determined by $^1$H-NMR spectroscopy. Each sample was dissolved in deuterated chloroform and measured on a Bruker spectrometer (AV400, 400 MHz). The relevant resonances in the $^1$H-NMR spectrum (relative to TMS=0 ppm) which were used for integration are as follows:
I1: 1.11-1.17: methyl group of polyether units; resonance area corresponds to three H atoms
I2: 1.25-1.32: methyl group of polycarbonate units; resonance area corresponds to three H atoms
I3: 1.45-1.49: methyl group of cyclic carbonate; resonance area corresponds to three H atoms
I4: 2.95-2.99: CH group of free, unreacted propylene oxide; resonance area corresponds to one H atom The following are recorded: the molar ratio of the amount of cyclic propylene carbonate to carbonate units in the polyethercarbonate polyol (selectivity, g/e), the molar ratio of carbonate groups to ether groups in the polyethercarbonate polyol (ratio e/f) and the proportion of converted propylene oxide (C in mol %).

Taking the relative intensities into consideration, the values were calculated as follows:
molar ratio of the amount of cyclic propylene carbonate to carbonate units in the polyethercarbonate polyol (selectivity, g/e):

$$g/e = I3/I2 \quad (X)$$

molar ratio of carbonate groups to ether groups in the polymer (e/f):

$$e/f = I2/I1 \quad (XI)$$

The molar proportion of converted propylene oxide (C in mol %), based on the sum of the amounts of propylene oxide used in the activation and the copolymerization, is calculated according to the following formula:

$$C = [((I1/3)+(I2/3)+(I3/3))/((I1/3)+(I2/3)+(I3/3)+I4)] \ast 100\% \quad (XII)$$

and was between 97.8 and >99.9% in the Examples.

The number-average and weight-average molecular weights, $M_n$ and $M_w$, of the polymers formed were determined by gel permeation chromatography (GPC) using the procedure according to DIN 55672-1: "Gel Permeation Chromatography, Part 1—Tetrahydrofuran as Eluent" (SECurity GPC system from PSS Polymer Service; flow rate 1.0 ml/min; columns: 2×PSS SDV linear M, 8×300 mm, 5 µm; RID detector). Polystyrene samples of known molecular weight were used for calibration.

The OH number (hydroxyl number) was determined according to DIN 53240-2, except that N-methylpyrrolidone was used instead of THF/dichloromethane as solvent. Titration was carried out with 0.5 molar ethanolic KOH solution (end point detection by potentiometry). The test substance used was castor oil of certified OH number. The recorded unit "mg/g" refers to mg[KOH]/g[polyethercarbonate polyol].

The following Examples 1 to 5 were carried out with PET-1 as starter. The pressure data refer to the absolute pressure.

Example 1

Polymerization of Propylene Oxide and $CO_2$ with a DMC Catalyst Dried Under Argon and Activated Under a $CO_2$ Atmosphere A mixture of DMC catalyst (23.8 mg) and PET-1 (30 g) was placed in a 300 ml pressurized reactor equipped with a hollow shaft agitator. The reactor was closed and the pressure inside was reduced to 5 mbar for five minutes. The reactor pressure was then regulated to 50 mbar by passing a gentle stream of Ar and simultaneously removing the gas with a pump. The reactor was heated to 130° C. and the mixture was agitated for 30 min (1500 rpm) at 130° C. under reduced pressure (50 mbar) and a gentle stream of Ar [step (α)]. A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 3 g of propylene oxide were metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time. The onset of a briefly increased evolution of heat in the reactor during this time confirmed the activation of the catalyst [step (β)]. After cooling to 100° C., a further 81 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step (γ)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.06.

The molar ratio of carbonate groups to ether groups in the polyethercarbonate polyol, e/f, was 20.1/79.9.

The polyethercarbonate polyol obtained had molecular weights $M_n$ of 5756 g/mol and $M_w$ of 13076 g/mol and a polydispersity of 2.27.

The OH number of the mixture obtained was 26.6 $mg_{KOH}$/g.

Example 2

Polymerization of Propylene Oxide and $CO_2$ with a DMC Catalyst Dried Under a $CO_2$ Atmosphere and Activated Under a $CO_2$ Atmosphere A mixture of DMC catalyst (23.8 mg) and PET-1 (30 g) was placed in a 300 ml pressurized reactor equipped with a hollow shaft agitator. The reactor was closed and the pressure inside was reduced to 5 mbar for five minutes. The reactor pressure was then regulated to 50 mbar by passing a gentle stream of $CO_2$ and simultaneously removing the gas with a pump. The reactor was heated to 130° C. and the mixture was agitated for 30 min (1500 rpm) at 130° C. under reduced pressure (50 mbar) and a gentle stream of $CO_2$ [step ($\alpha$)]. A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 3 g of propylene oxide were metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., a further 81 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.07.

The molar ratio of carbonate groups to ether groups in the polyethercarbonate polyol, e/f, was 20.5/79.5.

The polyethercarbonate polyol obtained had molecular weights $M_n$ of 6730 g/mol and $M_w$ of 15686 g/mol and a polydispersity of 2.33.

The OH number of the mixture obtained was 25.1 $mg_{KOH}$/g.

Comparative Example 3

Polymerization of Propylene Oxide and $CO_2$ with a DMC Catalyst Dried without $CO_2$ and Activated without $CO_2$ A mixture of DMC catalyst (23.8 mg) and PET-1 (30 g) was placed in a 300 ml pressurized reactor equipped with a hollow shaft agitator. The reactor was closed and the pressure inside was reduced to 5 mbar for five minutes. The reactor pressure was then regulated to 50 mbar (absolute) by passing a gentle stream of Ar and simultaneously removing the gas with a pump. The reactor was heated to 130° C. and the mixture was agitated for 30 min (1500 rpm) at 130° C. under a slight vacuum (50 mbar) and a gentle stream of Ar [step ($\alpha$)]. A pressure of 2.5 bar of argon was applied. 3 g of propylene oxide were then metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., the argon pressure was let down and a pressure of 15 bar of $CO_2$ was applied. The reactor pressure was kept at 15 bar during the subsequent steps by making up with $CO_2$. A further 81 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.08.

The molar ratio of carbonate groups to ether groups in the polyethercarbonate polyol, e/f, was 18.1/81.9.

The polyethercarbonate polyol obtained had molecular weights $M_n$ of 5644 g/mol and $M_w$ of 9576 g/mol and a polydispersity of 1.70.

The OH number of the mixture obtained was 25.0 $mg_{KOH}$/g.

Comparative Example 4

Polymerization of Propylene Oxide and $CO_2$ with a DMC Catalyst Dried with $CO_2$ and Activated without $CO_2$ A mixture of DMC catalyst (23.8 mg) and PET-1 (30 g) was placed in a 300 ml pressurized reactor equipped with a hollow shaft agitator. The reactor was closed and the pressure inside was reduced to 5 mbar for five minutes. The reactor pressure was then regulated to 50 mbar by passing a gentle stream of $CO_2$ and simultaneously removing the gas with a pump. The reactor was heated to 130° C. and the mixture was agitated for 30 min (1500 rpm) at 130° C. under a slight vacuum (50 mbar) and a gentle stream of $CO_2$. The pressure was then lowered to 5 mbar by switching off the stream of $CO_2$ [step ($\alpha$)]. A pressure of 2.5 bar of argon was applied. 3 g of propylene oxide were then metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., the argon pressure was let down and a pressure of 15 bar of $CO_2$ was applied. The reactor pressure was kept at 15 bar during the subsequent steps by making up with $CO_2$. A further 81 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.07.

The molar ratio of carbonate groups to ether groups in the polyethercarbonate polyol, e/f, was 18.5/81.5.

The polyethercarbonate polyol obtained had molecular weights $M_n$ of 5905 g/mol and $M_w$ of 10757 g/mol and a polydispersity of 1.82.

The OH number of the mixture obtained was 25.8 $mg_{KOH}$/g.

Comparative Example 5

Polymerization of Propylene Oxide and $CO_2$ with a DMC Catalyst Activated Under a $CO_2$ Atmosphere without Drying A mixture of DMC catalyst (23.8 mg) and PET-1 (30 g) was placed in a 300 ml pressurized reactor equipped with a hollow shaft agitator. The reactor was closed, the pressure inside was reduced to 5 mbar for five minutes and the mixture was heated to 130° C., with agitation (1500 rpm). A pressure of 2.5 bar of Ar was applied three times, the mixture was agitated for 5 minutes and the excess pressure was let down (inertization of the reactor). A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 3 g of propylene oxide were then metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step (β)]. After cooling to 100° C., a further 81 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step (γ)]. The reaction was ended by subsequently cooling the reaction mixture to room temperature, the excess pressure was let down and the resulting product was analysed.

NMR spectroscopic analysis of the reaction mixture showed that it still contained unreacted propylene oxide.

The selectivity g/e was 0.10.

The molar ratio of carbonate groups to ether groups in the polyethercarbonate polyol, e/f, was 19.3/80.7.

The polyethercarbonate polyol obtained had molecular weights $M_n$ of 5559 g/mol and $M_w$ of 12051 g/mol and a polydispersity of 2.17.

The OH number of the mixture obtained was 28.3 $mg_{KOH}$/g.

TABLE 1

Survey of the results of Examples 1 to 5

| Example | Drying (step α) | Activation (step β) | g/e | e/f | OH number [$mg_{KOH}$/g] |
|---|---|---|---|---|---|
| 1 | without $CO_2$ | under $CO_2$ | 0.06 | 20.1/79.9 | 26.6 |
| 2 | under $CO_2$ | under $CO_2$ | 0.07 | 20.5/79.5 | 25.1 |
| 3 (Comp.) | without $CO_2$ | without $CO_2$ | 0.08 | 18.1/81.9 | 25.0 |
| 4 (Comp.) | under $CO_2$ | without $CO_2$ | 0.07 | 18.5/81.5 | 25.8 |
| 5 (Comp.) | inertization | under $CO_2$ | 0.10 | 19.3/80.7 | 28.3 |

Comp.: Comparative Example

The ratio e/f is a measure of the efficiency of incorporation of carbon dioxide into the polymer chain: the greater the value of this ratio, the higher the proportion of carbon dioxide incorporated into the polymer in the reaction mixture. A comparison of Example 1 with Comparative Example 3 shows that activation (step β) under a $CO_2$ atmosphere leads to a greater incorporation of $CO_2$ and a better selectivity (i.e. low ratio of cyclic carbonate to polyethercarbonate polyol). Likewise, a comparison of Example 2 with Comparative Example 4 shows that activation (step β) under a $CO_2$ atmosphere leads to a greater incorporation of $CO_2$.

A comparison of Example 1 with Example 2 shows that drying (step α) under an inert gas (nitrogen) effects a further improvement in selectivity (i.e. low ratio of cyclic carbonate to polyethercarbonate polyol).

A comparison of Examples 1 and 2 with Comparative Example 5 shows that, in the case of activation of the DMC catalyst in the presence of $CO_2$, drying under reduced pressure [step (α)] is advantageous relative to inertization of the reactor because, in Comparative Example 5, disadvantageously there remains a residual content of unconverted propylene oxide, the resulting reaction mixture contains more cyclic carbonate and the incorporation of $CO_2$ is smaller.

The following Examples 6 to 10 were carried out with PET-2 as starter. The pressure data refer to the absolute pressure.

Example 6

Polymerization of Propylene Oxide and $CO_2$ with a DMC Catalyst Dried Under Argon and Activated Under a $CO_2$ Atmosphere A mixture of DMC catalyst (27.9 mg) and PET-2 (30 g) was placed in a 300 ml pressurized reactor equipped with a hollow shaft agitator. The reactor was closed and the pressure inside was reduced to 5 mbar for five minutes. The reactor pressure was then regulated to 50 mbar by passing a gentle stream of Ar and simultaneously removing the gas with a pump. The reactor was heated to 130° C. and the mixture was agitated for 30 min (1500 rpm) at 130° C. under reduced pressure (50 mbar) and a gentle stream of Ar [step (α)]. A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 3 g of propylene oxide were metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time. The onset of a briefly increased evolution of heat in the reactor during this time confirmed the activation of the catalyst [step (β)]. After cooling to 100° C., a further 100.5 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step (γ)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.13.

The molar ratio of carbonate groups to ether groups in the polyethercarbonate polyol, e/f, was 15.9/84.1.

The polyethercarbonate polyol obtained had molecular weights $M_n$ of 3036 g/mol and $M_w$ of 4899 g/mol and a polydispersity of 1.61.

The OH number of the mixture obtained was 56.2 $mg_{KOH}$/g.

Example 7

Polymerization of Propylene Oxide and $CO_2$ with a DMC Catalyst Dried Under a $CO_2$ Atmosphere and Activated Under a $CO_2$ Atmosphere A mixture of DMC catalyst (27.9 mg) and PET-2 (30 g) was placed in a 300 ml pressurized reactor equipped with a hollow shaft agitator. The reactor was closed and the pressure inside was reduced to 5 mbar for five minutes. The reactor pressure was then regulated to 50 mbar by passing a gentle stream of $CO_2$ and simultaneously removing the gas with a pump. The reactor was heated to 130° C. and the mixture was agitated for 30 min (1500 rpm) at 130° C. under reduced pressure (50 mbar) and a gentle stream of $CO_2$ [step ($\alpha$)]. A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 3 g of propylene oxide were metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., a further 100.5 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.14.

The molar ratio of carbonate groups to ether groups in the polyethercarbonate polyol, e/f, was 15.0/85.0.

The polyethercarbonate polyol obtained had molecular weights $M_n$ of 3187 g/mol and $M_w$ of 4770 g/mol and a polydispersity of 1.50.

The OH number of the mixture obtained was 56.9 $mg_{KOH}$/g.

Comparative Example 8

Polymerization of Propylene Oxide and $CO_2$ with a DMC Catalyst Dried without $CO_2$ and Activated without $CO_2$ A mixture of DMC catalyst (27.9 mg) and PET-2 (30 g) was placed in a 300 ml pressurized reactor equipped with a hollow shaft agitator. The reactor was closed and the pressure inside was reduced to 5 mbar for five minutes. The reactor pressure was then regulated to 50 mbar (absolute) by passing a gentle stream of Ar and simultaneously removing the gas with a pump. The reactor was heated to 130° C. and the mixture was agitated for 30 min (1500 rpm) at 130° C. under a slight vacuum (50 mbar) and a gentle stream of Ar [step ($\alpha$)]. A pressure of 2.5 bar of argon was applied. 3 g of propylene oxide were then metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., the argon pressure was let down and a pressure of 15 bar of $CO_2$ was applied. The reactor pressure was kept at 15 bar during the subsequent steps by making up with $CO_2$. A further 100.5 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.16.

The molar ratio of carbonate groups to ether groups in the polyethercarbonate polyol, e/f, was 14.6/85.4.

The polyethercarbonate polyol obtained had molecular weights $M_n$ of 3067 g/mol and $M_w$ of 4474 g/mol and a polydispersity of 1.46.

The OH number of the mixture obtained was 57.9 $mg_{KOH}$/g.

Comparative Example 9

Polymerization of Propylene Oxide and $CO_2$ with a DMC Catalyst Dried with $CO_2$ and Activated without $CO_2$ A mixture of DMC catalyst (27.9 mg) and PET-2 (30 g) was placed in a 300 ml pressurized reactor equipped with a hollow shaft agitator. The reactor was closed and the pressure inside was reduced to 5 mbar for five minutes. The reactor pressure was then regulated to 50 mbar by passing a gentle stream of $CO_2$ and simultaneously removing the gas with a pump. The reactor was heated to 130° C. and the mixture was agitated for 30 min (1500 rpm) at 130° C. under a slight vacuum (50 mbar) and a gentle stream of $CO_2$. The pressure was then lowered to 5 mbar by switching off the stream of $CO_2$ [step ($\alpha$)]. A pressure of 2.5 bar of argon was applied. 3 g of propylene oxide were then metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., the argon pressure was let down and a pressure of 15 bar of $CO_2$ was applied. The reactor pressure was kept at 15 bar during the subsequent steps by making up with $CO_2$. A further 100.5 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.15.

The molar ratio of carbonate groups to ether groups in the polyethercarbonate polyol, e/f, was 12.2/87.8.

The polyethercarbonate polyol obtained had molecular weights $M_n$ of 3180 g/mol and $M_w$ of 5116 g/mol and a polydispersity of 1.61.

The OH number of the mixture obtained was 55.5 $mg_{KOH}$/g.

Comparative Example 10

Polymerization of Propylene Oxide and $CO_2$ with a DMC Catalyst Activated Under a $CO_2$ Atmosphere without Drying A mixture of DMC catalyst (27.9 mg) and PET-2 (30 g) was placed in a 300 ml pressurized reactor equipped with a hollow shaft agitator. The reactor was closed, the pressure inside was reduced to 5 mbar for five minutes and the mixture was heated to 130° C., with agitation (1500 rpm). A pressure of 2.5 bar of Ar was applied three times, the mixture was agitated for 5 minutes and the excess pressure was let down (inertization of the reactor). A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 3 g of propylene oxide were then metered in with the aid of an HPLC pump (1.5 ml/min) and the reaction mixture was agitated for 20 min (1500 rpm). A further two 3 g portions of propylene oxide were then metered in with the aid of the HPLC pump (1.5 ml/min) and the reaction mixture was agitated for 20 min (1500 rpm) each time [step ($\beta$)]. After cooling to 100° C., a further 100.5 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by subsequently cooling the reaction mixture to room temperature, the excess pressure was let down and the resulting product was analysed.

The conversion of the propylene oxide was shown to be complete by NMR spectroscopic analysis of the reaction mixture.

The selectivity g/e was 0.17.

The molar ratio of carbonate groups to ether groups in the polyethercarbonate polyol, e/f, was 10.6/89.4.

The polyethercarbonate polyol obtained had molecular weights $M_n$ of 3048 g/mol and $M_w$ of 5704 g/mol and a polydispersity of 1.87.

The OH number of the mixture obtained was 57.2 $mg_{KOH}$/g.

TABLE 2

Survey of the results of Examples 6 to 10

| Example | Drying (step $\alpha$) | Activation (step $\beta$) | g/e | e/f | OH number [$mg_{KOH}$/g] |
|---|---|---|---|---|---|
| 6 | without $CO_2$ | under $CO_2$ | 0.13 | 15.9/84.1 | 56.2 |
| 7 | under $CO_2$ | under $CO_2$ | 0.14 | 15.0/85.0 | 56.9 |
| 8 (Comp.) | without $CO_2$ | without $CO_2$ | 0.16 | 14.6/85.4 | 57.9 |
| 9 (Comp.) | under $CO_2$ | without $CO_2$ | 0.15 | 12.2/87.8 | 55.5 |
| 10 (Comp.) | inertization | under $CO_2$ | 0.17 | 10.6/89.4 | 57.2 |

Comp.: Comparative Example

The ratio e/f is a measure of the efficiency of incorporation of carbon dioxide into the polymer chain: the greater the value of this ratio, the higher the proportion of carbon dioxide incorporated into the polymer in the reaction mixture. A comparison of Example 6 with Comparative Example 8 shows that activation (step $\beta$) under a $CO_2$ atmosphere leads to a greater incorporation of $CO_2$. Likewise, a comparison of Example 7 with Comparative Example 9 shows that activation (step $\beta$) under a $CO_2$ atmosphere leads to a greater incorporation of $CO_2$.

A comparison of Example 6 with Example 7 shows that drying (step $\alpha$) under an inert gas (nitrogen) effects a further improvement in selectivity (i.e. low ratio of cyclic carbonate to polyethercarbonate polyol).

A comparison of Examples 6 and 7 with Comparative Example 10 shows that, in the case of activation of the DMC catalyst in the presence of $CO_2$, drying under reduced pressure [step ($\alpha$)] is advantageous relative to inertization of the reactor because, in Comparative Example 10, disadvantageously the resulting reaction mixture contains more cyclic carbonate and the incorporation of $CO_2$ is smaller.

The following Example 11 was carried out with PET-3 as starter. The pressure data refer to the absolute pressure.

Example 11

Polymerization of Propylene Oxide and $CO_2$ with a DMC Catalyst Dried Under Argon and Activated Under a $CO_2$ Atmosphere A mixture of DMC catalyst (23.6 mg) and PET-3 (12.6 g) was placed in a 300 ml pressurized reactor equipped with a hollow shaft agitator, and agitated for 30 min (1500 rpm) at 130° C. under a slight vacuum (50 mbar) and a gentle stream of Ar [step ($\alpha$)]. A pressure of 15 bar of $CO_2$ was applied, causing the reactor temperature to fall slightly. The temperature was readjusted to 130° C. and the reactor pressure was kept at 15 bar during the subsequent steps by making up with $CO_2$. 1.3 g of propylene oxide were metered in with the aid of an HPLC pump (1.5 ml/min) and the reaction mixture was agitated for 20 min (1500 rpm). A further two 1.3 g portions of propylene oxide were then metered in with the aid of the HPLC pump (1.5 ml/min) and the reaction mixture was agitated for 20 min (1500 rpm) each time. The onset of a briefly increased evolution of heat in the reactor during this time confirmed the activation of the catalyst [step ($\beta$)]. After cooling to 100° C., a further 103.6 g of propylene oxide were metered in by means of an HPLC pump (1.5 ml/min), with agitation, and the agitation of the reaction mixture (1500 rpm) was continued. The mixture was agitated for a total of 3 h at 100° C. as from the beginning of the propylene oxide addition [step ($\gamma$)]. The reaction was ended by cooling the reactor in an ice bath, the excess pressure was let down and the resulting product was analysed.

No hot spot was observed during the reaction [step ($\gamma$)].

The conversion of the propylene oxide was shown to be complete by NMR spectroscopic analysis of the reaction mixture.

The selectivity g/e was 0.18.

The molar ratio of carbonate groups to ether groups in the polyethercarbonate polyol, e/f, was 21.2/78.8.

The polyethercarbonate polyol obtained had molecular weights $M_n$ of 5460 g/mol and $M_w$ of 14320 g/mol and a polydispersity of 2.62.

The OH number of the mixture obtained was 40.6 $mg_{KOH}$/g.

The invention claimed is:

1. A process for the preparation of a polyethercarbonate polyol from one or more H-functional starter compounds, one or more alkylene oxides and carbon dioxide in the presence of a double metal cyanide (DMC) catalyst, comprising
   ($\alpha$) ($\alpha$1) placing the DMC catalyst and one or more H-functional starter compounds in a reactor,
   ($\alpha$2) passing an inert gas, an inert gas/carbon dioxide mixture or carbon dioxide through the reactor at a temperature of 50 to 200° C. and at the same time establishing a reduced pressure (absolute) of 10 mbar to 800 mbar in the reactor by removal of the inert gas or carbon dioxide, to form a mixture,
   ($\beta$) adding, under an atmosphere of inert gas/carbon dioxide mixture or under a carbon dioxide atmosphere, a fraction based on the total amount of alkylene oxides used in steps ($\beta$) and ($\gamma$), one or more alkylene oxides to the mixture from step ($\alpha$) at temperatures of 50 to 200° C., and (γ) metering one or more alkylene oxides and carbon dioxide into a mixture resulting from step (β).

2. The process according to claim 1 wherein the amount of one or more alkylene oxides in step (β) is 0.1 to 25.0 wt. % based on the amount of starter compound used in step (α).

3. A process for the activation of a DMC catalyst, comprising
(α) (α1) placing the DMC catalyst and one or more H-functional starter compounds in a reactor,
(α2) passing an inert gas, an inert gas/carbon dioxide mixture or carbon dioxide through the reactor at a temperature of 50 to 200° C. and at the same time estblishing a reduced pressure (absolute) of 10 mbar to 800 mbar in the reactor by removal of the inert gas or carbon dioxide, to form a mixture, and
(β) adding, under an atmosphere of inert gas/carbon dioxide mixture or under a pure carbon dioxide atmosphere, alkylene oxide to the mixture from step (α) at temperatures of 50 to 200° C.

4. The process according to claim 1 comprising, in step (α),
(α1) placing the one or more H-functional starter compounds or a mixture of at least two H-functional starter compounds in the reactor, and
(α2) passing an inert gas, an inert gas/carbon dioxide mixture or carbon dioxide into the resulting mixture of DMC catalyst and one or more H-functional starter compounds at a temperature of 50 to 200° C., and at the same time establishing a reduced pressure (absolute) of 10 mbar to 800 mbar by removal of the inert gas or carbon dioxide,
wherein the DMC catalyst is added to the one or more H-functional starter compounds or the mixture of at least two H-functional starter compounds in step (α1) or directly thereafter in step (α2).

5. The process according to claim 1 wherein the inert gas is argon and/or nitrogen.

6. The process according to claim 1 comprising, in steps (β) and/or (γ), introducing the carbon dioxide into the mixture by
(i) feeding gas into the reaction mixture from underneath the reactor;
(ii) using a hollow shaft agitator;
(iii) combining the metering operations according to (i) and (ii); and/or
(iv) feeding gas over the liquid surface using agitating elements.

7. The process according to claim 1 wherein, in steps (β) and/or (γ), the carbon dioxide is introduced into the mixture by feeding gas into the reaction mixture from underneath the reactor via an inlet tube, a gas dispersion ring or a combination of an inlet tube or gas dispersion ring with a gas dispersion agitator.

8. The process according to claim 7 wherein one or more agitator stages are arranged on an agitator shaft above the gas dispersion agitator.

9. The process according to claim 1 wherein, in steps (β) and/or (γ), the carbon dioxide is introduced into the mixture through a tubular agitator or a pitched-blade turbine with hollow blades.

10. The process according to claim 1 wherein the one or more H-functional starter compounds are selected from at least one of the group consisting of alcohols, amines, thiols, amino alcohols, thio alcohols, hydroxy esters, polyether polyols, polyester polyols, polyesterether polyols, polycarbonate polyols, polyethercarbonate polyols, poly-ethyleneimines, polyetheramines, polytetrahydrofurans, polyetherthiols, polyacrylate polyols, castor oil, ricinoleic acid mono- or diglyceride, fatty acid monoglycerides, chemically modified fatty acid mono-, di- and/or triglycerides, and fatty acid $C_1$-$C_{24}$-alkyl esters containing an average of at least 2 OH groups per molecule.

11. The process according to claim 1 wherein the one or more H-functional starter compounds are selected from at least one of the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, and di- and trifunctional polyether polyols, the polyether polyol being made up of a di- or tri-H-functional starter substance and propylene oxide or a di- or tri-H-functional starter substance, propylene oxide and ethylene oxide, and the polyether polyols having a molecular weight $M_n$ ranging from 62 to 4500 g/mol and a functionality of 2 to 3.

12. The process according to claim 1 wherein the DMC catalyst comprises at least one double cyanide compound selected from the group consisting of zinc hexacyano-cobaltate(III), zinc hexacyanoiridate(III), zinc hexacyanoferrate (III), and cobalt(II) hexa-cyanocobaltate(III).

13. The process according to claim 1 wherein the DMC catalyst comprises at least one organic complexing ligand selected from the group consisting of aliphatic ether, ethanol, isopropanol, n-butanol, isobutanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether, and 3-methyl-3-oxetane-methanol.

14. The process according to claim 1, wherein the process is carried out in a tubular reactor, an agitated tank or a loop reactor.

15. The process according to claim 1, wherein the process is carried out in an agitated tank, a tubular reactor or a loop reactor, and wherein, in step (γ), one or more H-functional starter compounds are metered continuously into the agitated tank during the reaction.

* * * * *